(12) United States Patent
Potter et al.

(10) Patent No.: US 7,257,048 B1
(45) Date of Patent: Aug. 14, 2007

(54) COUNTERMEASURE SYSTEM AND METHOD TO EMULATE TARGET WITH SPATIAL EXTENT

(75) Inventors: Lynn Alan Potter, North Kingstown, RI (US); Roderick E. Ayers, Warren, RI (US); Joseph B. Lopes, Seekonk, MA (US); C. Ray Dutton, North Dartmouth, MA (US); Jarrod H. Wasko, West Kingston, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 11/357,471

(22) Filed: Feb. 6, 2006

(51) Int. Cl.
*G01S 7/38* (2006.01)
(52) U.S. Cl. .......................................................... 367/1
(58) Field of Classification Search .................... 367/1; 342/13, 14, 15
See application file for complete search history.

(56) References Cited

U.S. PATENT DOCUMENTS

| 5,144,587 | A |  | 9/1992 | Mason |
| 5,253,216 | A |  | 10/1993 | Haisfield |
| 5,600,087 | A |  | 2/1997 | Chace, Jr. |
| 6,542,109 | B2 |  | 4/2003 | Lloyd et al. |
| 2002/0145554 | A1 | * | 10/2002 | Lloyd et al. .................. 342/13 |

* cited by examiner

*Primary Examiner*—Dan Pihulic
(74) *Attorney, Agent, or Firm*—James M. Kasischke; Jean-Paul A. Nasser; Michael P. Stanley

(57) ABSTRACT

An acoustic countermeasure system comprises a plurality of individual countermeasure devices which act in concert to emulate a target with spatial extent. The individual countermeasure devices may be programmed to navigate into predetermined positions within a preset pattern with spatial characteristics similar to that of a target of interest, e.g., a submarine. The individual countermeasure devices are programmed to produce acoustic signals, such as in response to a ping or pulse by an incoming torpedo that collectively appears to be an echo similar to that which would come from a target having spatial extent.

10 Claims, 3 Drawing Sheets

POSSIBLE PRE-SET
RUN PATTERNS

FIGURE EIGHT

RACE TRACK

FIXED MANEUVERS

COUNTERMEASURE SYSTEM AND METHOD TO EMULATE TARGET WITH SPATIAL EXTENT

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION (1) Field of the Invention

The present invention relates generally to acoustic countermeasures and, more particularly, to acoustic countermeasures which project a spatial extent.

(2) Description of the Prior Art

Various types of acoustic countermeasures are well known for use in decoying or jamming acoustic sensors utilized by incoming torpedoes. One of the weaknesses of acoustic countermeasures that try to decoy or jam a modern threat torpedo is that they have no spatial extent. Instead, they appear as a point source to the incoming torpedo. Once the torpedo comes sufficiently close to the countermeasure, the torpedo can use its beam forming capability of its front array to determine that the acoustic energy coming from the countermeasure has no spatial extent, that is, it is emanating from a single point in space. Thus, it cannot be a target and must be an acoustic countermeasure. The torpedo then can take the appropriate anti-countermeasure maneuver or tactic and continue to pursue its target.

The following U.S. patents describe various prior art systems that may be related to the above and/or other telemetry systems:

U.S. Pat. No. 5,144,587, issued Sep. 1, 1992, to Mason, discloses an expendable moving echo radiator suitable for providing a decoy to attract a homing torpedo and divert the torpedo away from its intended target. The present invention provides an expandable and collapsible curtain for deployment from a capsule launched from a submarine or other sea vessel. In its expanded configuration, the curtain is characterized by a physical profile sufficient to reflect acoustic waves and to generate echoes substantially similar to echo signals generated by an actual, full size submarine or other target. The present invention is further provided with propulsion means, as well as means for enhancing its capability to capture a torpedo's sensors. It can also be provided with explosives to destroy lured torpedoes. The expendable device can be used to simulate a submarine for anti-submarine warfare (ASW) training, thereby affording the advantage that a package of easily transportable size becomes a full size submarine-like target. In using the echo radiator as a target, the expendable device can be preprogrammed or remotely controlled for self-navigation purposes.

U.S. Pat. No. 5,253,216, issued Oct. 12, 1993, to Haisfield, discloses a countermeasure for acoustic homing torpedoes where a plurality of sound transducers are transversely arrayed across the attack path of the torpedo. The transducers are energized in a time sequence to simulate a relative transducer movement in a direction across the path of the torpedo. The torpedo is thereby misdirected by the high level acoustic signal produced in the transducers slowly changing the location of the signal. The signal is interrupted to provide a silent period, such absence of a signal being interpreted by the torpedo as a miss causing the torpedo to initiate a turn and commence a search which will "exhaust" the torpedo. This sequence is repeated while the torpedo is within a close range of the target.

U.S. Pat. No. 5,600,087, issued Feb. 4, 1997, to Chace, Jr. et al, discloses an expendable underwater vehicle for use in training naval forces in anti-submarine warfare in ocean waters that is between about three to five feet in length and about five inches in diameter, and it is field programmable. The expendable underwater vehicle can be programmed in the field at the location where the vehicle actually will be used as a training device. A system for field programming the vehicle comprises a run geometry generator and a portable interface module. The run geometry generator downloads the operational parameters to the portable interface module, and the portable interface module then downloads the operational parameters into the vehicle. These operational parameters are stored in the vehicle and then used by the vehicle during an in-water run.

U.S. Pat. No. 6,542,109, issued Apr. 1, 2003, to Lloyd et al, discloses an autonomous off-board defensive aids system for use with a host craft, for example, with combat aircraft or submarines. More particularly, the host craft deploys a plurality of controllable off-board units to counter an offensive threat or to engage in autonomous offensive actions. The controllable off-board units implement active stealth facilities: each off-board unit having a receiver unit for detecting impinging detection pulses, for example radar or sonar pulses, and a transmitter unit for generating an artificial detection pulse profile, for example "spoofing" or masking the presence of the host craft. The controllable off-board units are of two types: tethered and free moving. The off-board units can have conventional propulsion apparatus, for instance, propellers, rockets or jets. Off-board units each have control apparatus which allows the off-board units (104, 106) to co-operate. General commands are conveyed to the control apparatus by control cabling provided in the tether cable.

The above cited prior art does not disclose a system which gives the appearance to an incoming torpedo or other sonar detectors to be a large object when if fact it is not. The advantages and benefits to solutions to the above described and/or related problems have been long sought without success. Consequently, those skilled in the art will appreciate the present invention that addresses the above and other problems.

SUMMARY OF THE INVENTION

It is a general purpose of the present invention to provide an improved acoustic countermeasure system.

An object of the present invention is an acoustic countermeasure system that responds to pings or pulses in a manner that emulates a target with spatial extent rather than a point transmitter, e.g., a submarine.

These and other objects, features, and advantages of the present invention will become apparent from the drawings, the descriptions given herein, and the appended claims. However, it will be understood that above listed objects and advantages of the invention are intended only as an aid in understanding certain aspects of the invention, are not intended to limit the invention in any way, and do not form a comprehensive or exclusive or restrictive list of objects, features, and advantages.

Accordingly, an acoustic countermeasure system is provided that is operable for responding to acoustic pulses or acoustic pings from a threat such as an incoming torpedo. The system may comprise one or more elements such as, for instance, a plurality of individual countermeasure devices programmable for coordinated movement into a predetermined spatial pattern after launch. The plurality of individual countermeasure devices are operable for simultaneously or substantially simultaneously responding to the acoustic ping from the threat such that a combined acoustic response of the plurality of individual countermeasures emulates an acoustic echo of a target with spatial extent.

The acoustic countermeasure system may further comprise a launcher operable for simultaneously launching the plurality of individual countermeasure devices. In one embodiment of the invention, each of the plurality of individual countermeasure devices may be programmed with different acoustic response levels to the acoustic ping from the threat to better emulate the acoustic echo of the target with spatial extent as may comprise differing structures, frameworks, or the like.

The acoustic countermeasure system may further comprise a navigation section for each of the plurality of individual countermeasure devices to guide each of the plurality of individual countermeasure devices into a particular position within the predetermined spatial pattern. One or more acoustic transducers may be provided for each of the plurality of individual countermeasure devices for receiving the acoustic ping from the threat and transmitting an acoustic response which collectively emulates the acoustic echo of the target with spatial extent.

In operation, the present invention comprises a method for simulating a target with spatial extent. Methods steps may comprise, for instance, launching a plurality of individual countermeasure devices and/or programming the plurality of individual countermeasure devices to move into respective positions which are spatially offset with respect to each other, and/or programming the plurality of individual countermeasure devices to simultaneously or substantially simultaneously acoustically respond to a ping whereby a collective response of the plurality of individual countermeasure devices emulates an acoustic echo of a target with spatial extent.

The method may further comprise launching the plurality of individual countermeasure devices from a single launch tube simultaneously or substantially simultaneously. The method may further comprise programming the plurality of individual countermeasure devices to emulate a loitering submarine.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings, wherein like reference numerals refer to like parts and wherein.

DESCRIPTION OF THE PREFERRED EMBODIMENT

Figure 1:
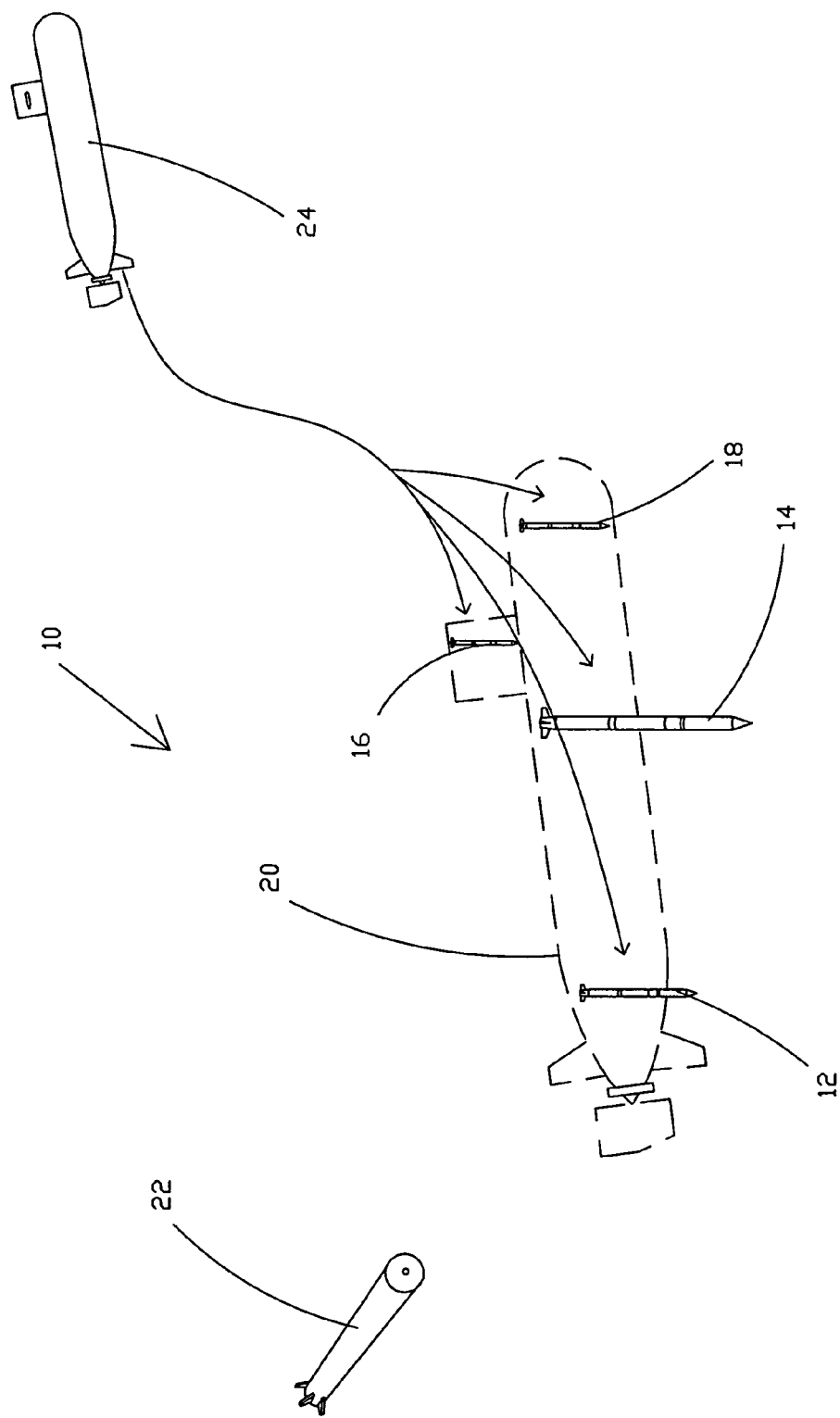
FIG. 1 is a schematic which shows conceptually the design of a simulated target for spoofing a threat such as an incoming torpedo in accord with one possible embodiment of the present invention.

Referring now to the drawings and, more particularly, to FIG. 1 there is shown acoustic countermeasure system 10 in operation in accord with the present invention. In this example, acoustic countermeasure system 10 comprises a plurality such as four or more relatively small countermeasure devices 12, 14, 16, and 18 which hover in position to simulate the spatial extent of simulated target 20. Countermeasure devices 12, 14, 16, and 18 are mobile and may be programmed to fan out and move into a position that simulates simulated target 20, e.g., the general extent of a loitering submarine. If the four or more countermeasure devices, e.g., countermeasure devices 12, 14, 16, and 18, are programmed to respond with differing source levels, and with their coordinated spacing, the acoustic response of the group of countermeasures to a ping from incoming threat torpedo 22 will look very much like the response of the ping bouncing off of the hull of a submarine. This response will cause threat torpedo 22 to continue to close in on the group of countermeasure devices 12, 14, 16, and 18 rather than prosecute the actual target, e.g., real submarine 24. As threat torpedo 22 comes in closer to the group of countermeasures 12, 14, 16, an 18, the group "response" will sufficiently simulate the spatial extent of an actual submarine. The programming of threat torpedo 22 will then be fooled to continue to prosecute acoustic countermeasure system 10 rather than search for real target 24. In this example, countermeasure device 12 is positioned near the aft end of simulated target 20, countermeasure 14 simulates a central portion, countermeasure 16 simulates a conning tower, and countermeasure 18 simulates a forward portion of simulated target 20. The collective acoustic response to a ping from threat torpedo 22 created from the multiple spaced countermeasures creates an incoming acoustic signal that is difficult to distinguish from a real target such as real target 24.

Figure 2:
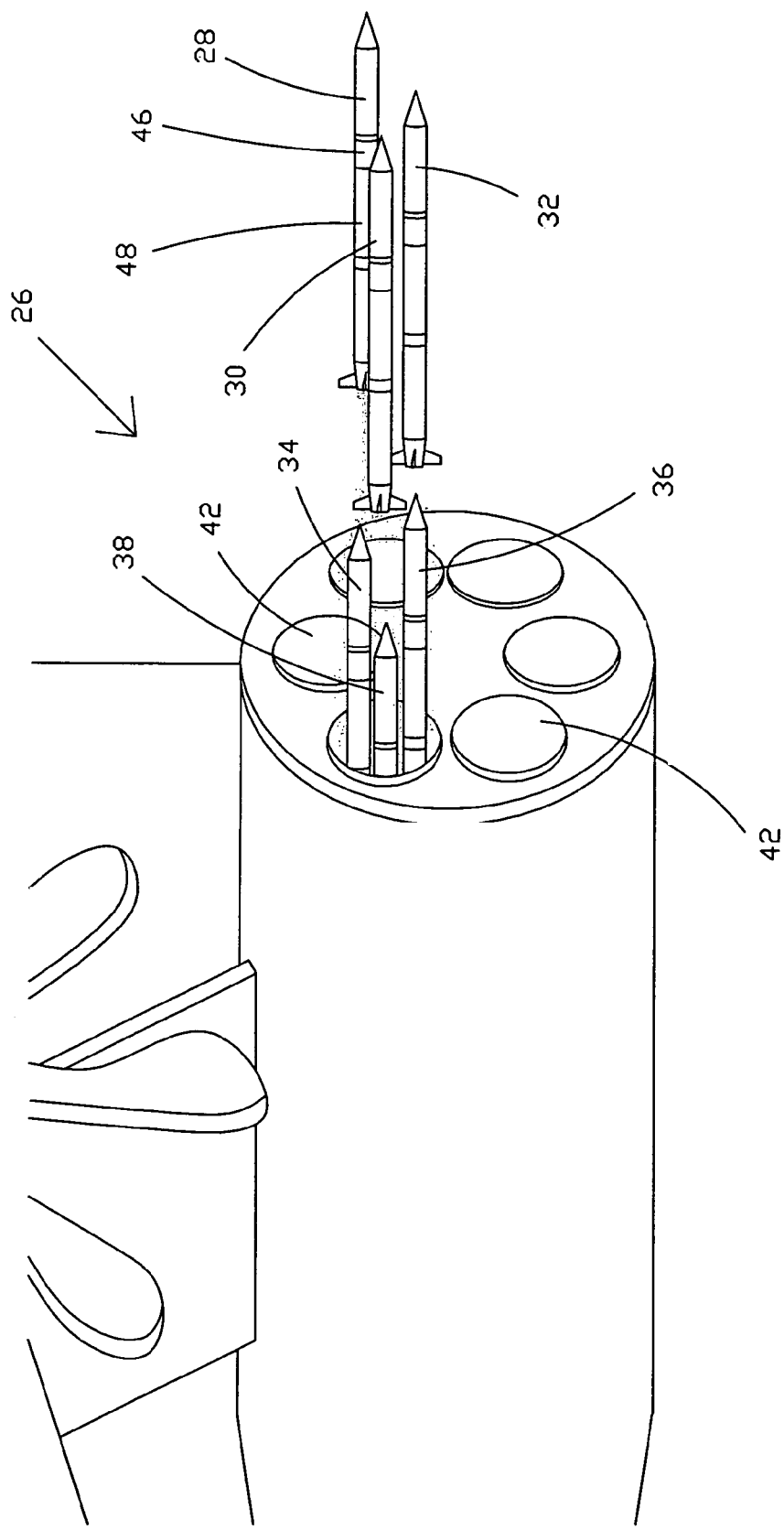
FIG. 2 is an isometric view of a multiple mobile countermeasure launcher in accord with one possible embodiment of the present invention.

FIG. 2 discloses one possible embodiment of launching acoustic countermeasure system 10 utilizing external countermeasure launcher 26. In this embodiment, external countermeasure launcher 26 is operable for launching one or more countermeasures and in one preferred embodiment is operable for launching a group of countermeasure devices simultaneously. In this example, six countermeasure devices 28, 30, 32, 34, 36, and 38 are launched simultaneously. External countermeasure launcher 26 may be positioned under the water as shown in FIG. 2. However, if used for ships, then external countermeasure launcher 26 may be mounted above the water line. In one preferred embodiment, external countermeasure launcher 26 may comprise multiple launch tubes, such as tubes 40 and 42, which contain additional groups of countermeasure devices. Accordingly, the group of countermeasure devices may be launched rapidly from a single tube upon detection of incoming threat 22 and/or in a situation where an incoming threat is anticipated to be launched.

Figure 3:
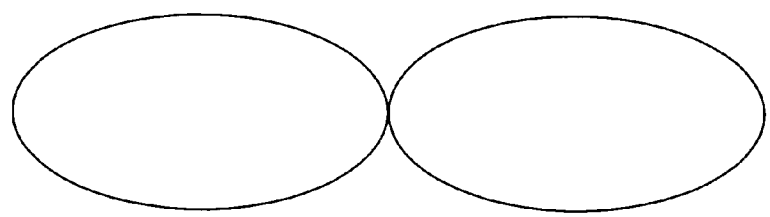
FIG. 3 is a schematic showing possible pre-set run patterns for a group of mobile countermeasures in accord with the present invention.
Figure 3:
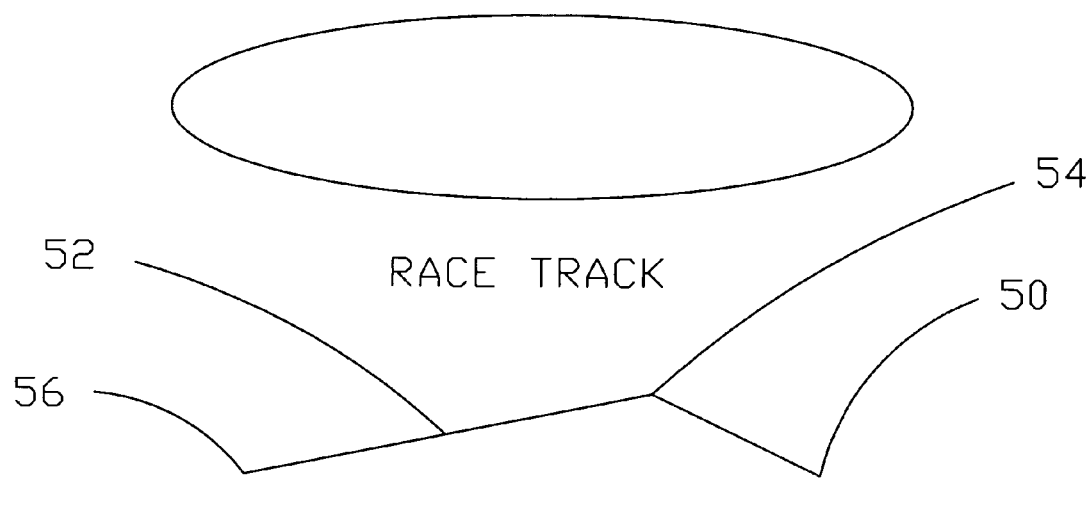

FIG. 3 schematically shows a few possible preset run patterns in which a group of countermeasure devices, such as countermeasure devices 12, 14, 16, and 18 shown in FIG. 1, may organize themselves to thereby emulate or simulate a target such as simulated target 20, also shown in FIG. 1. For instance, four countermeasure devices may set up in a run pattern as indicated whereby a countermeasure device is located at each of the positions indicated at 50, 52, 54, and 56 whereby their combined acoustic response may appear to indicate a submarine to the acoustic detection system of an incoming threat.

For this purpose, in one embodiment, acoustic countermeasure system 10 is initialized at power up and the individual countermeasure devices (or at least a lead countermeasure device,) know their starting point in space relative to their launch point, such as from external countermeasure launcher 26. As the countermeasure devices, such as countermeasure devices 12, 14, 16, and 18, move through the water, a sensor suite, which may be built into each countermeasure device, or into at least a lead countermeasure device, provides data for the countermeasure devices to calculate their current location versus the point in space where each is suppose to go to within the preset run pattern such as those shown in FIG. 3 and make course corrections and adjust their position accordingly. For this purpose, in one embodiment of the invention each countermeasure device may have a guidance and navigation system integrated into an electronics section, such as encased electronics section 48 shown in FIG. 2 for countermeasure device 28. Encased electronics section 48 may comprise guidance and navigation equipment comprising an X and Y-axis gyro, a compass, hail effect roll sensors, and a serial interface between the guidance computer and an external tactical computer which may be utilized to provide the preset information. Preset information may include run profiles that may include preset run patterns as shown in FIG. 3. In a preferred embodiment, a user is able to pre-program a run profile for the countermeasure devices by issuing commands on a computer using run profile software specifically designed to tailor each segment of the run profile. Each issued command is a run segment that sets the depth, bearing, time duration and acoustic mode of each countermeasure device through the course of the entire run. In addition the run profile software will be able to pre-determine battery consumption for a profile and account and compensate for vehicle dynamics during the run.

In a preferred embodiment, each countermeasure device is mobile, and carries a wide band transmitting transducer and a wide band receiver transducer operable for receiving acoustic pings from incoming threat 22 and transmitting appropriate responses at desired acoustic sound levels in return. For instance, in FIG. 2, acoustic transducer 46 and the like may be utilized for this purpose. If desired, the individual countermeasure systems may communicate with each other such as with a lead countermeasure device with respect to which the outer countermeasure devices key off. Alternatively, each countermeasure device may navigate to a selected position in a preset run pattern as indicated in FIG. 3. Once in position, the countermeasure devices may or may not confirm their relative position by communicating among themselves. Acoustic countermeasure system 10 is capable of having a pre-programmed run profile downloaded from a laptop, if desired, or tactical computer or the like. The pre-programmed run profile drives the guidance system commands for countermeasure system 10.

Accordingly the present invention comprises coordinated movement of a plurality of individual countermeasure devices. For example, the group of mobile countermeasures within acoustic countermeasure system 10 may go into a precalculated position and simulate a loitering submarine. The present invention overcomes the decoy problem of a lack of spatial extent of a single acoustic countermeasure. In one embodiment, each countermeasure device may be programmed or pre-programmed to respond with different acoustic source sound levels to better simulate differing highlight structures.

In operation, the individual acoustic countermeasure devices in acoustic countermeasure system 10 may be pre-programmed with information needed for each individual countermeasure device to travel to a position in a predetermined pattern at which the device may hover in position. Alternatively the individual acoustic countermeasure devices may continue to travel with coordinated movement while maintaining the predetermined pattern to represent a moving underwater vehicle or may vary the pattern to represent a turning underwater vehicle.

Upon detection of an incoming threat 22, a group of individual countermeasure devices may be launched simultaneously or substantially simultaneously as may be accomplished with countermeasure launcher 26. Once launched the countermeasure devices spread out into a predetermined shape such that when the incoming torpedo pings the group with its sonar, then the simultaneous or substantially simultaneous acoustic response of each of the group of individual countermeasure devices simulates the spatial response or acoustic echo of a target with spatial extent such as a submarine thereby fooling the incoming torpedo as to the location of the real submarine.

Many additional changes in the details, components, steps, algorithms, and organization of the system, herein described and illustrated to explain the nature of the invention, may be made by those skilled in the art within the principle and scope of the invention. It is therefore understood that within the scope of the appended claims, the invention may be practiced otherwise than as specifically described.

What is claimed is:

1. An acoustic countermeasure system operable for responding to an acoustic ping from a threat, comprising:

a plurality of individual countermeasure devices programmable for coordinated movement into a predetermined spatial pattern after launch, said plurality of individual countermeasure devices in said predetermined spatial pattern being operable for simultaneously or substantially simultaneously responding to said acoustic ping from said threat such that a combined acoustic response of said plurality of individual countermeasures to said acoustic ping from said threat emulates an acoustic echo of a target with spatial extent.

2. The acoustic countermeasure system of claim 1, further comprising a launcher operable for simultaneously launching said plurality of individual countermeasure devices.

3. The acoustic countermeasure system of claim 1, wherein each of said plurality of individual countermeasure devices may be programmed with different acoustic response levels to said acoustic ping from said threat to better emulate said acoustic echo of said target with spatial extent as comprising differing structures.

4. The acoustic countermeasure system of claim 1, further comprising a navigation section for each of said plurality of individual countermeasure devices to guide each of said plurality of individual countermeasure devices into a particular position within said predetermined spatial pattern.

5. The acoustic countermeasure system of claim 1, further comprising one or more acoustic transducers for each of said plurality of individual countermeasure devices for receiving said acoustic ping from threat and transmitting an acoustic response which collectively emulates said acoustic echo of said target with spatial extent.

6. An acoustic countermeasure method for simulating a target with spatial extent, comprising:

launching a plurality of individual countermeasure devices;

programming said plurality of individual countermeasure devices to move into respective positions which are spatially offset with respect to each other; and programming said plurality of individual countermeasure devices to simultaneously or substantially simultaneously acoustically respond to a ping whereby a collective response of said plurality of individual countermeasure devices emulates an acoustic echo of a target with spatial extent.

7. The method of claim 6, further comprising launching said plurality of individual countermeasure devices from a single launch tube.

8. The method of claim 6, further comprising launching said plurality of individual countermeasure devices simultaneously or substantially simultaneously.

9. The method of claim 6, further comprising programming said plurality of individual countermeasure devices for self-guidance into a predetermined spatial pattern sized similarly as said target with spatial extent.

10. The method of claim 6, further comprising programming said plurality of individual countermeasure devices to emulate a loitering submarine.

* * * * *